United States Patent
Menon et al.

(10) Patent No.: US 11,541,738 B2
(45) Date of Patent: Jan. 3, 2023

(54) VEHICLE BATTERY HOUSING, VEHICLE BATTERY PACK AND ELECTRIC VEHICLE

(71) Applicants: Daimler AG, Stuttgart (DE); AVL List GmbH, Graz (AT)

(72) Inventors: Vikram Menon, Kawasaki (JP); Markus Uhl, Kawasaki (JP); Roland Macherhammer, Graz (AT); Peter Del Negro, Graz (AT)

(73) Assignees: Daimler Truck AG, Leinfelden-Echterdingen (DE); AVL List GmbH, Graz (AT)

( * ) Notice: Subject to any disclaimer, the term of this patent is extended or adjusted under 35 U.S.C. 154(b) by 37 days.

(21) Appl. No.: 17/047,639

(22) PCT Filed: Apr. 26, 2019

(86) PCT No.: PCT/JP2019/017836
§ 371 (c)(1),
(2) Date: Oct. 14, 2020

(87) PCT Pub. No.: WO2019/208749
PCT Pub. Date: Oct. 31, 2019

(65) Prior Publication Data
US 2021/0107344 A1 Apr. 15, 2021

(30) Foreign Application Priority Data
Apr. 27, 2018 (JP) .............................. JP2018-086973

(51) Int. Cl.
*B60K 1/00* (2006.01)
*B60K 1/04* (2019.01)
(Continued)

(52) U.S. Cl.
CPC ................ *B60K 1/04* (2013.01); *B60L 50/66* (2019.02); *B62D 21/02* (2013.01);
(Continued)

(58) Field of Classification Search
CPC .... B60K 1/04; B60K 2001/0416; B60L 50/66
See application file for complete search history.

(56) References Cited

U.S. PATENT DOCUMENTS 5,736,272 A * 4/1998 Veenstra ............... H01M 50/20
429/97
8,051,934 B2 * 11/2011 Kiya .................... H01M 50/242
180/274
(Continued)

FOREIGN PATENT DOCUMENTS

CN    203871400 U    10/2014
EP    3 095 146 B1   11/2016
(Continued)

OTHER PUBLICATIONS

PCT/JP2019/017836, International Search Report dated Jun. 11, 2019 (One (1) page).
(Continued)

*Primary Examiner* — Hau V Phan
(74) *Attorney, Agent, or Firm* — Crowell & Moring LLP

(57) ABSTRACT

A vehicle battery housing which enables an electric vehicle to have an increased battery on-board capacity. The vehicle battery housing is mounted on a vehicle having a ladder frame and includes a first battery accommodating portion arranged in a first space between two side rails constituting the ladder frame and a second battery accommodating portion greater in vehicle-widthwise dimension than the first battery accommodating portion and connected to the first battery accommodating portion to be located in a second space vehicle-heightwise below the first space.

9 Claims, 3 Drawing Sheets

(51) Int. Cl.
  *B60L 50/60* (2019.01)
  *H01M 50/249* (2021.01)
  *H01M 50/207* (2021.01)
  *B62D 21/02* (2006.01)

(52) U.S. Cl.
  CPC ....... *H01M 50/207* (2021.01); *H01M 50/249* (2021.01); *B60K 2001/0416* (2013.01); *H01M 2220/20* (2013.01)

(56) References Cited

U.S. PATENT DOCUMENTS

| | | | | |
|---|---|---|---|---|
| 9,636,984 | B1 * | 5/2017 | Baccouche | H01M 50/24 |
| 10,319,966 | B2 * | 6/2019 | Liu | B60K 1/04 |
| 10,493,837 | B1 * | 12/2019 | Angelo | B60L 50/66 |
| 2009/0014224 | A1 * | 1/2009 | Rydberg | B60R 16/04 |
| | | | | 180/68.5 |
| 2017/0069886 | A1 | 3/2017 | Liu et al. | |

FOREIGN PATENT DOCUMENTS

| | | |
|---|---|---|
| JP | 9-98517 A | 4/1997 |
| JP | 2001-97048 A | 4/2001 |
| JP | 2010-36901 A | 2/2010 |
| JP | 2014-69686 A | 4/2014 |
| JP | 2016-113063 A | 6/2016 |
| WO | WO 2015/165407 A1 | 11/2015 |

OTHER PUBLICATIONS

U.S. Patent Application, "Vehicle Battery Pack Support Device", filed Oct. 14, 2020, Inventor Vikram Menon et al.

Japanese Office Action issued in Japanese application No. 2018-086973 dated Mar. 16, 2022, with partial English translation (Eight (8) pages).

English-language European Office Action issued in European application No. 19 792 970.6-1012 dated Aug. 9, 2022 (Five (5) pages).

* cited by examiner

VEHICLE BATTERY HOUSING, VEHICLE BATTERY PACK AND ELECTRIC VEHICLE

TECHNICAL FIELD

The present invention relates to a vehicle battery housing for use in electric vehicles such as full electric cars and hybrid electric cars, a vehicle battery pack comprising batteries held in the vehicle battery housing, and an electric vehicle equipped with the vehicle battery pack.

BACKGROUND ART

From a viewpoint of reducing environmental burdens, development of electric vehicles, such as full electric cars using a motor as a power source for propulsion in place of an internal combustion engine which used as an engine and hybrid electric cars using both an internal combustion engine and a motor, has been progressing. In such electric vehicles, a battery for driving the motor is mounted. Supplied with electricity from the battery, the motor generates power to move the vehicle.

In recent years, also in the field of commercial vehicles such as trucks, development of electric vehicles has been being promoted. For example, Patent Document 1 discloses a battery box holding structure for a commercial vehicle which provides improved collision. safety.

CITATION LIST

Patent Document [Patent Document 1] Japanese Patent Laid-Open No. 2016-113063

SUMMARY OF THE INVENTION

Problem to be Solved by the Invention

However, commercial vehicles, which are configured to carry cargo and large in size, have a great vehicle weight as compared with passenger cars. In the field of commercial vehicles having a great vehicle weight as compared with passenger cars, in order to put an electric vehicle with a sufficient travel range into practical use, increasing the battery on-board capacity of the electric vehicle is an important issue.

The present invention has been made in view of the above problem. An object of the present invention is to provide a vehicle battery housing enabling the vehicle to have an increased battery on-board capacity, a vehicle battery pack comprising batteries held in the vehicle battery housing, and an electric vehicle equipped with the vehicle battery pack.

Arrangement for Solving the Problem (1) The vehicle battery housing according to the embodiment is intended to be mounted on a vehicle having a ladder frame, and comprises a first battery accommodating portion arranged in a first space between. two side rails constituting the ladder frame, and a second battery accommodating portion greater in vehicle-widthwise dimension than the first battery accommodating portion and connected to the first battery accommodating portion to be located in a second space vehicle-heightwise below the first space.

The vehicle battery housing configured and arranged relative to the side rails as described above makes it possible to mount batteries using a space delimited by the side rails, effectively, thereby enabling the vehicle to have an increased battery on-board capacity.

(2) In the vehicle battery housing described in paragraph (1) above, the vehicle-widthwise dimension of the second battery accommodating portion may be greater than a distance between the two side rails. The second battery housing member with a vehicle-widthwise dimension determined this way can hold an increased number of batteries, and thus, enables the vehicle to have an increased battery on-board capacity.

(3) In the vehicle battery housing described in paragraph (1) or (2) above, the first battery accommodating portion may be located between a vehicle-widthwise inner edge of a flange of one of the two side rails and a vehicle-widthwise inner edge of a flange of the other side rail. In this arrangement, the lateral sides of the first battery accommodating portion are each covered by the corresponding side rail, so that the first battery accommodating portion is protected against an external force applied from a side of the vehicle, leading to improved lateral collision safety.

(4) In the vehicle battery housing described in in paragraph or (3) above, the vehicle-widthwise dimension of the second battery accommodating portion may be greater than a distance between. webs of the two side rails. The second accommodating portion with a vehicle-widthwise dimension determined this way can hold an increased number of batteries, thus contributing to an increase in battery on-board capacity of the vehicle.

(5) In the vehicle battery housing described in in paragraph (2) or (3) above, the vehicle-widthwise dimension of the second battery accommodating portion may be smaller than a distance between webs of the two side rails. The second battery accommodating portion with a vehicle-widthwise dimension determined this way is protected by the side rails from an external force applied from a side of the vehicle, leading to improved lateral collision safety.

(6) In the vehicle battery housing described in any of paragraphs (1) to (5) above, the second battery accommodating portion is higher in stiffness than the first battery accommodating portion. In this case, also the batteries held in the second battery accommodating portion which is likely to be influenced by an external force applied from a side of the vehicle are protected from the external force, leading to improved lateral collision safety.

(7) In the vehicle battery housing described in any of paragraphs (1) to (6) above, the first battery accommodating portion and the second battery accommodating portion may be made of the same metal. In this case, corrosion of the material of which the first and second accommodating portions are made is prevented, leading to enhanced reliability of the vehicle battery housing.

(8) In the vehicle battery housing described in any of paragraphs (1) to (7) above, the first battery accommodating portion may provide a principal holding region in which batteries are arranged and additional holding regions located to vehicle-widthwise both outer sides of the principal holding region. This configuration uses the space delimited by the side rails, effectively, and facilitates arrangement of components other than batteries, such as wires, leading to a simple layout within the battery housing.

(9) In the vehicle battery housing described in paragraph (3) above, the additional holding regions may each have a vehicle-heightwise dimension gradually decreasing toward the corresponding side rail. This enables methodical arrangement of wires, etc. within the battery housing, leading to a simple layout within the battery housing.

(10) A vehicle battery pack according to the embodiment comprises a vehicle battery housing described in any of paragraphs (1) to above, a first battery arranged in the first battery accommodating portion, and a second battery arranged in the second battery accommodating portion. In this vehicle battery pack, the vehicle battery housing arranged relative to the side rails as described above makes it possible to mount batteries using the space delimited by the side rails, effectively. The vehicle battery pack can therefore provide an increased battery on-board capacity for the vehicle.

(11) A vehicle battery pack according to the embodiment comprises the vehicle battery housing described in paragraph (8) or (9), a plurality of batteries arranged in the first and second battery accommodating portions, and a high-voltage wire and a low-voltage wire arranged in the additional holding regions, respectively. This vehicle battery pack uses the space delimited by the side rails, effectively, and the wires are arranged methodically within the battery housing.

(12) The electric vehicle according to the embodiment is equipped with the vehicle battery pack described in paragraph (10) or (11) above. In this electric vehicle, the vehicle battery housing arranged relative to the side rails as described above makes it possible to mount batteries using the space delimited by the side rails, effectively. Consequently, the electric vehicle can have an increased battery on-board capacity.

MODE OF CARRYING OUT THE INVENTION

With reference to the accompanying drawings, configurations of embodiments of the present invention will be described in detail.

First Embodiment

Figure 1:
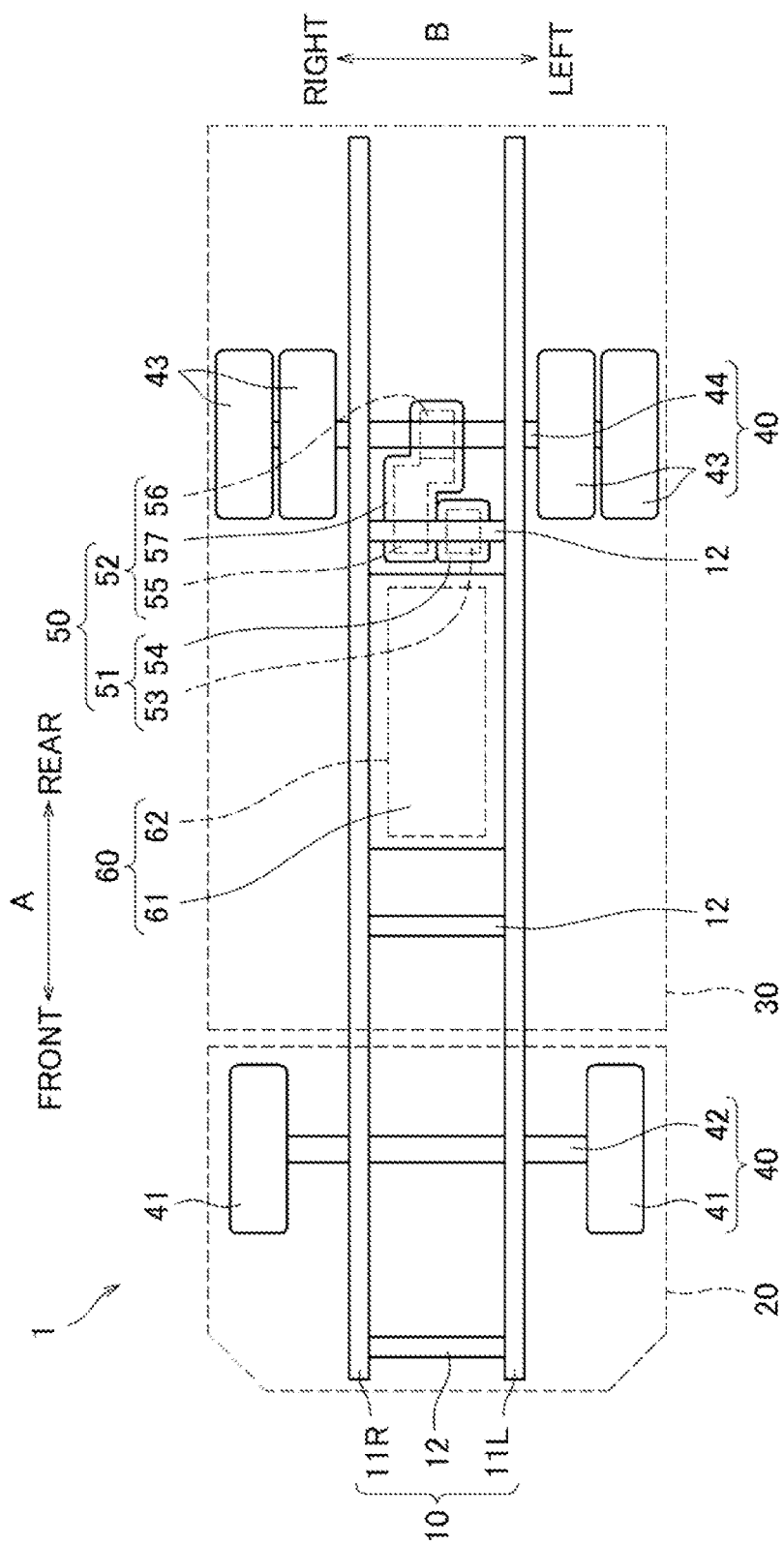
FIG. 1 is a top view schematically showing the total structure of an electric vehicle according to a first embodiment of the present invention.

First, with reference to FIG. 1, the total structure of an electric vehicle 1 according to a first embodiment will be described. FIG. 1 is a top view schematically showing the total structure of the electric vehicle according to the first embodiment.

As shown in FIG. 1, the electric vehicle 1 according to the present embodiment is an electric truck comprising a ladder frame 10, a cab 20, a cargo box 30, wheel mechanisms 40, a drive apparatus 50 and a battery pack 60. FIG. 1 represents the ladder frame, etc. seen from the top of the electric vehicle 1 through the cab 20 and the cargo box 30.

Although in the present embodiment, the electric vehicle 1 is a full electric car having a motor (electric motor) as a drive source for propulsion, the electric vehicle may be a hybrid electric car having also an engine. Further, the electric vehicle 1 is not limited to an electric truck but may be another commercial vehicle equipped with a battery for moving the vehicle.

The ladder frame 10 comprises a left side rail 11L, a right side rail 11R and cross-members 12. The left side rail 11L and the right side rail 11R extend in the longitudinal (front-rea) direction A of the electric vehicle 1. They are separated from each other in the lateral (width) direction B of the vehicle and parallel to each other. The left side rail 11L and the right side rail 11R are connected by the cross-members 12 to form a ladder-shaped frame 10 called a ladder frame. The ladder frame 10 supports the cab 20, the cargo box 30, the drive apparatus 50, the battery pack 60 and other heavy objects mounted on the electric vehicle 1. Hereinafter, the left side rail 11R and the right side rail 11R will be sometimes referred to simply as side rails 11.

The cab 20 is a structure with a driver's seat, not shown, and arranged over the front of the ladder frame 10. The cargo box 30 is a structure into which cargo to be transported by the electric vehicle 1 is loaded, and arranged over the rear of the ladder frame 10.

In the present embodiment, the wheel mechanism 40 arranged in the front of the vehicle includes left and right front wheels 41 and a front axle 42, or shaft for the two front wheels 41. The wheel mechanism 40 arranged in the rear of the vehicle includes rear wheels 43, specifically two left rear wheels and two right rear wheels, and a rear axle 44, or shaft for the rear wheels 43. In the electric vehicle 1, the rear wheels 43 are drive wheels to which drive power is transmitted to move the electric vehicle 1. The wheel mechanisms 40 are each connected to the ladder frame 10 by a suspension mechanism, not shown, and thus, support the weight of the electric vehicle 1.

The drive apparatus 50 comprises a motor unit 51 and a gear unit 52. The motor unit. 51 comprises a motor 53 and a motor housing 54 enclosing the motor 53. The gear unit 52 comprises a speed reducing mechanism 55 consisting of a plurality of gears, a differential mechanism 56 which distributes power transmitted from the speed reducing mechanism 55 to the left and right rear wheels 43, and a gear housing 57 enclosing the speed reducing mechanism 55 and the differential mechanism 56.

The drive apparatus 50 is configured such that drive torque generated by the motor 53 is reduced by the speed reducing mechanism 55 to a level suited for moving the vehicle and transmitted via the differential mechanism 56 to the rear axle 44. The drive apparatus 50 can thus rotate the rear wheels 43 via the rear axle 44, thereby moving the electric vehicle 1. In the present embodiment, the drive apparatus 50 is arranged to a laterally (vehicle-widthwise) inner side of each side rail 11L, 11R (in other words, in the space between the side rails) and supported to the ladder frame 10 by support members, not shown.

The battery pack 60 comprises a plurality of batteries 61 which supplies electricity to the motor 53 and thus functions as an energy source for moving the electric vehicle 1, and a battery housing 62 enclosing the batteries 61. The battery pack 60 is a large-capacity secondary battery of relatively large size to store electricity required for the electric vehicle 1. In the present embodiment, the battery pack 60 is arranged in the vehicle, longitudinally in front of the drive apparatus 50 and laterally (vehicle-widthwise) between the left and right side rails 11L, 11R. For example, the battery pack 60 is fixed or suspended to the ladder frame 10 by connecting elements not shown. The detailed description of arrangement of the battery pack 60 relative to the side rails 11 will be given later.

Figure 2:
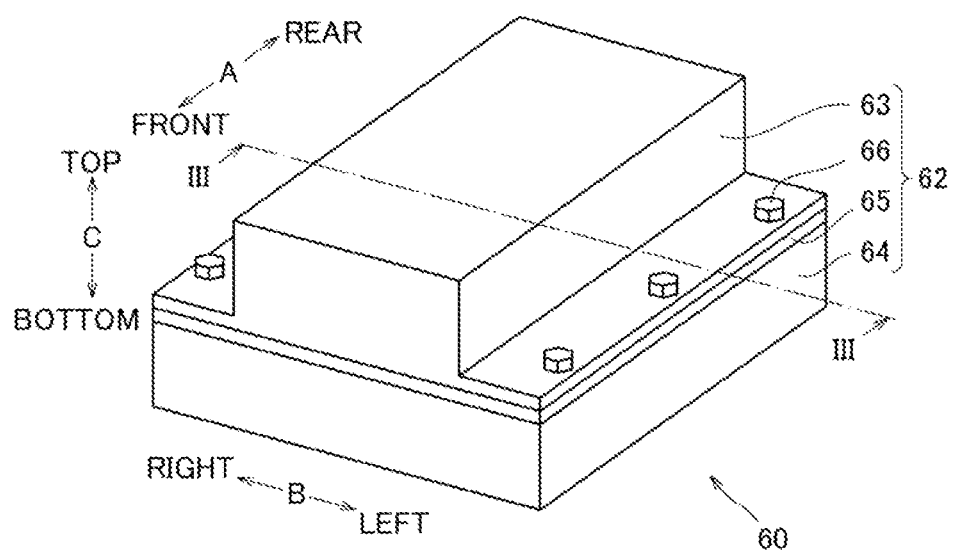
FIG. 2 is a perspective view of a battery housing according to the first embodiment of the present invention.
Figure 3:
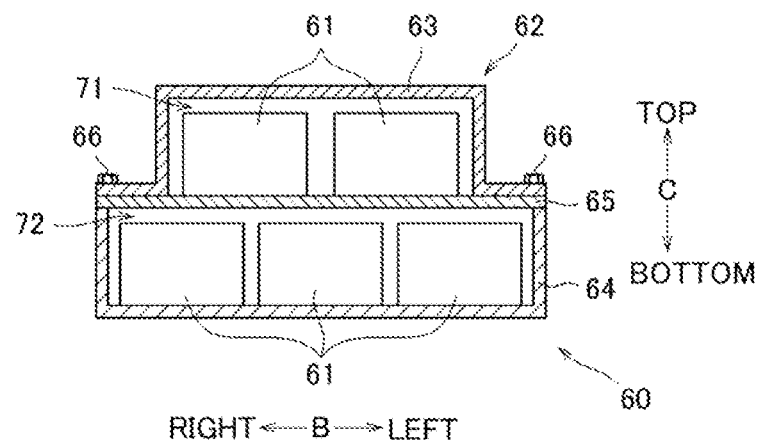
FIG. 3 is a cross-sectional view along line in FIG. 2.

Next, with reference to FIGS. 2 and 3, the configuration of the battery pack 60 according to the first embodiment will be described. FIG. 2 is a perspective view of the battery housing according to the first embodiment. FIG. 3 is a cross-sectional view along line in FIG. 2.

As seen from FIG. 2, the battery pack 60 has a shape extending in the longitudinal (front-rear) direction A of the vehicle and having an inverted T-shaped cross-section parallel in the plane determined by the lateral (width) direction B and the vertical (height) direction C of the vehicle.

As shown in FIGS. 2 and 3, the battery housing 62 constituting the battery pack 60 comprises a first battery accommodating portion 63, a second battery accommodating portion 64, a partition 65, and joining elements 66. The first and second battery accommodating portions 63, 64 are box-shaped casings for holding batteries, open at one side. The first and second battery accommodating portions 63, 64 are arranged with their open sides facing each other with the partition 65 interposed between them. The first and second battery accommodating portions 63, 64 and the partition 65 are joined together by the joining elements 66 inserted into the second battery accommodating portion. 64 through the first accommodating portion 63 and the partition 65.

The battery housing 62 constructed this way has a cuboidal first battery holding space 71 delimited by the first battery accommodating portion 63 and the partition 64 and a cuboidal second battery holding space 72 delimited by the second battery accommodating portion 64 and the partition 72. The first and second battery holding spaces 71, 72 are thus separated by the partition 65.

As shown in FIG. 3, the second battery accommodating portion. 64 is greater in size than the first battery accommodating portion 63, and the second battery holding space 72 is greater in size than the first battery holding space 71. Specifically, the second battery accommodating portion 64 is greater in width, or dimension parallel to the lateral (width) direction B of the vehicle than the first battery accommodating portion 63, and approximately equal in dimension parallel to the longitudinal (front-rear) direction A and dimension parallel to the vertical (height) direction C of the vehicle to the first battery accommodating portion 63. Likewise, the second battery holding space 72 is greater in width, or dimension parallel to the lateral (width) direction B of the vehicle than the first battery holding space 71, and approximately equal in dimension parallel to the longitudinal (front-rear) direction A and dimension parallel to the vertical (height) direction C of the vehicle to the first battery holding space 71. Consequently, as compared with the first battery holding space 71, the second battery holding space 72 allows a large number of batteries 61 to be arranged therein. In the present example, two batteries 61 are arranged in the first battery holding space 71 while three batteries 61 are arranged in the second battery holding space 72.

Here, the group of batteries 61 arranged in the first battery accommodating portion 63 (first battery holding space 71) is referred to as a first battery, while the group of batteries 61 arranged in the second battery accommodating portion 64 (second battery holding space 72) is referred to as a second battery. The batteries 61 are electrically connected by wires, not shown. The number of the batteries is not limited to the above but may be changed appropriately depending on the amount of electricity required for the electric vehicle 1 and the size, properties, etc. of the battery 61.

The first battery accommodating portion 63, the second battery accommodating portion 64 and the partition 65 are each made of, for example a light metal such as aluminum. This makes it possible to realize a battery pack 60 reduced in weight and robust enough to withstand external forces. The above components of the battery housing 62 may be made of the same metal. This prevents corrosion of the joining elements 66 which join the components to construct the battery housing 62.

The second battery accommodating portion 64 is higher in stiffness than the first battery accommodating portion 63. Appropriate stiffnesses may be given to them, for example by making the second battery accommodating portion 61 thicker than the first battery accommodating portion 63. The reason for making the second battery accommodating portion 64 higher in stiffness than the first battery accommodating portion 63 is: while the first battery accommodating portion 63 is arranged between the side rails 11, and thus, protected by the side rails 11 against lateral collision, the second battery accommodating portion 64 is located below the side rails 11, and thus, desired to have enhanced lateral collision safety. Causing the first and second battery accommodating portions to have appropriate stiffnesses, respectively, leads to a reduction in weight of the first battery accommodating portion, and thus, of the battery pack 60 and improved lateral collision safety.

Appropriate stiffnesses may be realized by a method other than adjusting the thicknesses of the first and second battery accommodating portions. For example, appropriate stiffnesses may be realized by forming a first battery accommodating portion 63 by machining a sheet material obtained by rolling, while forming a second battery accommodating portion 64 by extruding or molding a relatively-thick and rigid bulky material if corrosion of the joining elements 66 can be prevented, it is also possible to form a first battery accommodating portion 63 from a lighter material such as a resin, while forming a second battery accommodating portion 64 from a metal.

Figure 4:
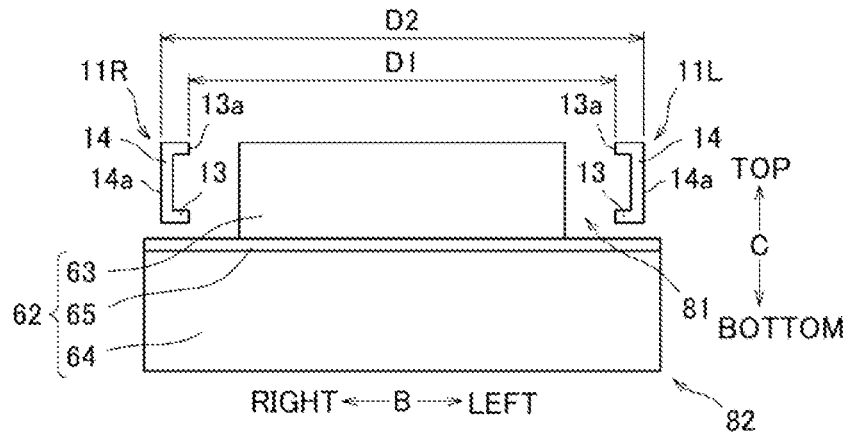
FIG. 4 is a front view showing how the battery housing according to the first embodiment of the present invention is arranged relative to side rails.

Next, with reference to FIG. 4, how the battery housing 62 according to the first embodiment is arranged relative to the side rails 11 will be described, FIG. 4 is a front view showing how the battery housing 62 according to the first embodiment is arranged relative to the side rails 11.

As shown in FIG. 4, there is a first space 81 between the left and right side rails 11L, 11R, and vertically (vehicle-heightwise) below the first space 81 is present a second space 82. The battery housing 62 is arranged to extend across the boundary between the first and second spaces 81, 82.

Specifically, the battery housing 62 is arranged with the first battery accommodating portion 63 located chiefly in the first space 81. More specifically, in the present embodiment, the first battery accommodating portion 63 is located between a laterally (vehicle-widthwise) inner edge 13a of a flange 13 of the left side rail 11L and a laterally (vehicle-widthwise) inner edge 13a of a flange 13 of the right side rail 11R. The first battery accommodating portion 63 has therefore a width, or dimension parallel to the lateral (width) direction B of the vehicle smaller than the distance between the side rails. Here, the distance between the side rails means a distance D1 from the laterally (vehicle-widthwise) inner edge 13a of the flange 13 of the left side rail 11L to the laterally (vehicle-widthwise) inner edge 13a of the flange 13 of the right side rail 11R.

The battery housing 62 is arranged with the second battery accommodating portion 64 and the partition 65 located in the second space 82 below the side rails 11. In other words, the battery housing 62 is arranged with the second battery accommodating portion 64 and the partition 65 jointed to the first battery accommodating portion 63 in the second space 82.

In the present embodiment, the second battery accommodating portion 64 and the partition 65 have a width, or dimension parallel to the lateral (width) direction B of the vehicle greater than a distance between webs of the side rails, not only the distance D1 between the side rails. Thus, the second battery accommodating portion 64 and the partition 65 project laterally beyond each side rail 11. Here, the distance between the webs means a distance D2 from the laterally (vehicle-widthwise) outer surface 14a of the web 14 of the left side rail 11L to the laterally (vehicle-widthwise) outer surface 14a of the web 14 of the right side rail 11R.

By using the battery housing 62 configured and arranged relative to the side rails 11 as described above, batteries 61 can be mounted using the space delimited by the side rails 11 effectively, and thus, the electric vehicle 1 can have an increased battery on-board capacity.

In the present embodiment, the second battery accommodating portion. 64 has a width, or dimension parallel to the lateral (width) direction B of the vehicle greater than the distance between the webs of the side rails 11, which contributes to an increase in battery on-board capacity, while the first battery accommodating portion 63 is located between the side rails 1, which contributes to an improvement in lateral collision safety.

Although in the present embodiment, the first battery holding space 71 provided by the first battery accommodating portion 64 and the second battery holding space 72 provided by the second battery accommodating portion 64 are separated by the partition 65, the first and second battery accommodating portions may provide a single continuous holding space without a partition 65. In this case, batteries 61 may be arranged to extend across the boundary between the first and second battery accommodating portions 63, 64.

Second Embodiment

Figure 5:
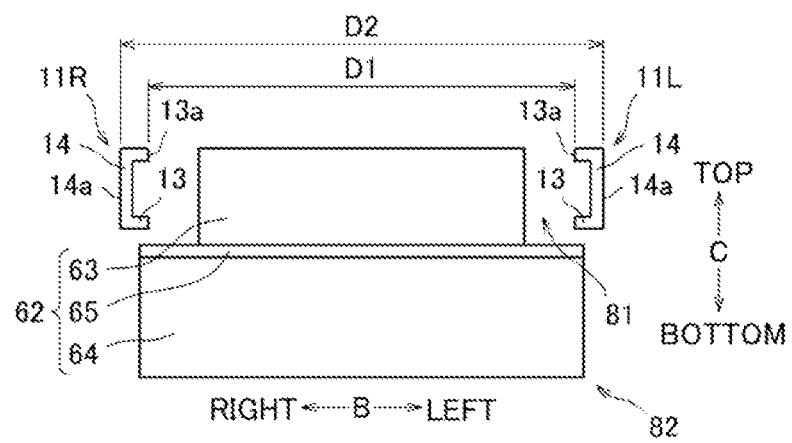
FIG. 5 is a front view showing how a battery housing according to a second embodiment of the present invention is arranged relative to side rails.

Although in the first embodiment, the width, or vehicle-widthwise dimension of the second battery accommodating portion 64 is greater than the distance between the webs of the side rails 11, it may be smaller than the distance between the webs of the side rails 11. Next, with reference to FIG. 5, the battery pack configured this way will be described as a second embodiment. FIG. 5 is a front view showing how the battery housing according to the second embodiment is arranged relative to the side rails.

As shown in FIG. 5, in the battery pack 60 according to the second embodiment, the second battery accommodating portion 64 has a width, or dimension parallel to the lateral (width) direction B of the vehicle smaller than the distance D2 between the webs of the side rails 11 and greater than the distance D1 between the side rails 11. In the battery pack configured and arranged this way, the lateral collision safety of the second battery accommodating portion 64 is improved without decreasing the battery on-board capacity of the vehicle.

In order to further improve the lateral collision safety of the second battery v 64, the second battery accommodating portion 64 may have a width, or dimension parallel to the lateral (width) direction B of the vehicle smaller than the distance D1 between the side rails, if it allows the electric vehicle 1 to have a required battery on-board capacity.

Third Embodiment

Figure 6:
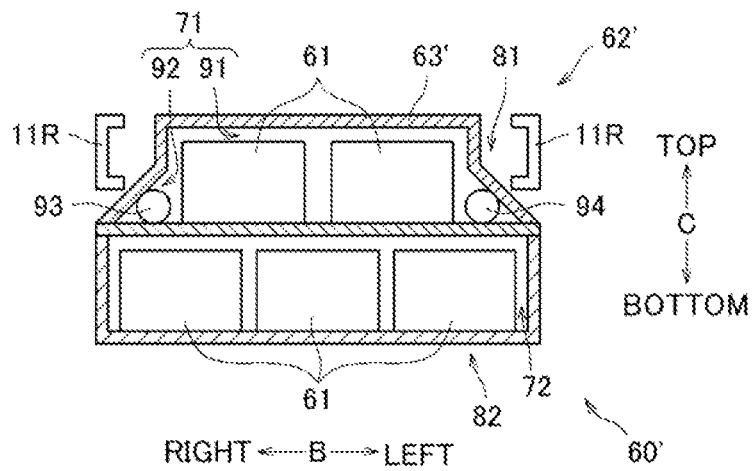
FIG. 6 is a cross-sectional view showing how a battery housing according to a third embodiment of the present invention is arranged relative to side rails.

Although in the first embodiment, the battery pack 60 has an inverted T-shaped cross-section, it may have another shape. Next, with reference to FIG. 6, the battery pack having an inverted. Y-shaped cross-section will be described as a third embodiment. FIG. 6 is a cross-sectional view showing how the battery housing according to the third embodiment is arranged relative to the side rails.

As seen from FIG. 6, the battery pack 60' according to the third embodiment is different in the shape of the first battery accommodating portion but identical in the shape of the other components to the battery pack 60 according to the first embodiment. Thus, the components other than the first battery accommodating portion 63' are given the same reference signs as given to the corresponding components of the first embodiment, and the description of those components will be omitted.

As shown in FIG. 6, the first battery accommodating portion 63' has a width, or dimension parallel to the lateral (width) direction B of the vehicle which is constant in the first space 81 between the side rails 11, but in the second space 82 below the side rails 11, gradually increases downward, when viewed along the vertical (height) direction C of the vehicle. Thus, the side walls of the first battery accommodating portion 63' each include a portion inclined toward the corresponding side rail 11.

The first battery accommodating portion 63' of this shape provides a principal holding region 91 for batteries 61 and additional holding regions 92 located to laterally (vehicle-widthwise) outer sides of the principal holding region 91. Each additional holding region 91 has a height, or dimension parallel to the vertical (height) direction C of the vehicle, gradually decreasing toward the corresponding side rail 11. In other words, the first battery accommodating portion provides a first battery holding space 71' including the principal holding region 91 and the additional holding regions 92.

Unlike the principal holding region 91, each additional holding region 92 is not great enough to hold a battery 61, but it allows wires of various types to run. In the present embodiment, a high-voltage wire 93 and a low-voltage wire 94 are arranged in the additional holding regions 92, respectively.

As described above, the present embodiment provides spaces for wires connecting the batteries 61 to each other and wires for extracting electricity from the batteries, using the space delimited by the side rails 11 effectively, which leads to a simple layout within the battery housing 62'.

REFERENCE SIGNS LIST

1 Electric vehicle
10 Ladder frame
11 Side rail
11L Left side rail
11R Right side rail
12 Cross-member
13 Flange
13a Laterally (vehicle-widthwise) inner edge
14 Web
14a Laterally (vehicle-widthwise) outer surface
20 Cab
30 Cargo box 40 Wheel mechanism
41 Front wheel
42 Front axle
43 Rear wheel
44 Rear axle
50 Drive apparatus
51 Motor unit
52 Gear unit
53 Motor
54 Motor housing
55 Speed reducing mechanism
56 Differential mechansim
57 Gear housing
60 Battery pack
61 Battery
62 Battery housing
63 First battery accommodating portion
64 Second battery accommodating portion
65 Partition
66 Joining element
71 First battery holding space
72 Second battery holding space
81 First space
82 Second space
91 Principal holding region
92 Additional holding region
93 High-voltage wire
94 Low-voltage wire
A Longitudinal (front-rear) direction of the vehicle
B Lateral (width) direction of the vehicle
C Vertical (height) direction of the vehicle

The invention claimed is:

1. A vehicle battery housing mounted on a vehicle having a ladder frame, comprising:
   a first battery accommodating portion disposed in a first space between two side rails constituting the ladder frame; and
   a second battery accommodating portion, wherein the second battery accommodating portion is greater in a vehicle-widthwise dimension than the first battery accommodating portion, wherein the second battery accommodating portion is connected to the first battery accommodating portion, wherein the second battery accommodating portion is disposed in a second space, wherein the second space is below the first space in a vehicle-heightwise dimension, wherein the vehicle-widthwise dimension of the second battery accommodating portion is greater than a distance between the two side rails, and wherein the vehicle-widthwise dimension of the second battery accommodating portion is smaller than a distance between webs of the two side rails.

2. The vehicle battery housing according to claim 1, wherein the first battery accommodating portion is located between a vehicle-widthwise inner edge of a flange of one of the two side rails and a vehicle-widthwise inner edge of a flange of the other side rail of the two side rails.

3. The vehicle battery housing according to claim 1, wherein the second battery accommodating portion is higher in stiffness than the first battery accommodating portion.

4. The vehicle battery housing according to claim 1, wherein the first battery accommodating portion and the second battery accommodating portion are made of a same metal.

5. The vehicle battery housing according to claim 1, wherein the first battery accommodating portion includes a principal holding region in which batteries are disposed and two holding regions respectively disposed on outer sides of the principal holding region in the vehicle-widthwise dimension.

6. The vehicle battery housing according to claim 5, wherein the two holding regions each gradually decrease toward a corresponding side rail in the vehicle-heightwise dimension.

7. A vehicle battery pack, comprising:
   the vehicle battery housing according to claim 1;
   a first battery disposed in the first battery accommodating portion; and
   a second battery disposed in the second battery accommodating portion.

8. The vehicle battery pack according to claim 7, wherein the first battery accommodating portion includes a principal holding region and two holding regions respectively disposed on outer sides of the principal holding region in the vehicle-widthwise dimension, wherein a plurality of batteries are disposed in the first and the second battery accommodating portions, and wherein a high-voltage wire and a low-voltage wire are respectively disposed in the two holding regions.

9. An electric vehicle, comprising:
   a vehicle battery pack comprising:
      a vehicle battery housing mounted on the electric vehicle having a ladder frame, comprising:
         a first battery accommodating portion disposed in a first space between two side rails constituting the ladder frame; and
         a second battery accommodating portion, wherein the second battery accommodating portion is greater in a vehicle-widthwise dimension than the first battery accommodating portion, wherein the second battery accommodating portion is connected to the first battery accommodating portion, wherein the second battery accommodating portion is disposed in a second space, wherein the second space is below the first space in a vehicle-heightwise dimension, wherein the vehicle-widthwise dimension of the second battery accommodating portion is greater than a distance between the two side rails, and wherein the vehicle-widthwise dimension of the second battery accommodating portion is smaller than a distance between webs of the two side rails;
      a first battery disposed in the first battery accommodating portion; and
      a second battery disposed in the second battery accommodating portion.

* * * * *